United States Patent [19]

Ishihara et al.

[11] 3,994,735
[45] Nov. 30, 1976

[54] COATING COMPOSITION

[75] Inventors: Takamasa Ishihara, Suita; Hirohumi Tuka, Higashiosaka; Shinichi Hasegawa, Settsu, all of Japan

[73] Assignee: Sumitomo Chemical Company, Limited, Osaka, Japan

[22] Filed: Aug. 22, 1974

[21] Appl. No.: 499,597

Related U.S. Application Data

[62] Division of Ser. No. 294,948, Oct. 4, 1972, Pat. No. 3,880,789.

[52] U.S. Cl. .................................... 106/14; 106/2; 106/273 R; 106/273 N; 106/278; 106/279; 106/281 R; 260/28 R

[51] Int. Cl.² ................. C08L 95/00; C09D 5/08; C09D 3/24

[58] Field of Search ................. 106/14, 2, 273, 278, 106/279, 284; 260/28

[56] References Cited

UNITED STATES PATENTS

| | | | |
|---|---|---|---|
| 3,772,231 | 11/1973 | Enomoto et al. | 260/28 |
| 3,835,077 | 9/1974 | Mori et al. | 260/28 |
| 3,839,061 | 10/1974 | Lehureau et al. | 260/28 |
| 3,842,024 | 10/1974 | Rieux et al. | 260/28 |
| 3,880,789 | 4/1975 | Ishihara et al. | 260/28 |

*Primary Examiner*—Joan E. Welcome
*Attorney, Agent, or Firm*—Stewart and Kolasch

[57] ABSTRACT

A coating composition of tar-epoxy resin or tar-polyurethane resin which comprises using as the tar component, cresol tar (i.e. the distillation residue having a boiling point of not lower than 200° C in the preparation of cresols using cymene), the composition being useful as a water repellent or a corrosion inhibitor.

8 Claims, No Drawings

COATING COMPOSITION

This is a divisional of copending application Ser. No. 294,948 filed on Oct. 4, 1972, Now U.S. Pat. No. 3,880,789.

The present invention relates to a coating composition, particularly to an improvement in a coating composition of tar-epoxy resin or tar-polyurethane resin.

The coating composition of tar-epoxy resin or tarpolyurethane resin has been widely used as a water repellent, a corrosion inhibitor or the like for building materials, iron or non-ferrous vessels, instruments, apparatuses, steel pipes, sea side buildings and so on, because of its good chemical resistance, flexibility, adhesiveness and abrasion resistance with low costs. Such coating composition, however, contains as the tar component in the binder, coal tar, coal tar pitch or petroleum asphalt, usually in an amount of 40 to 75% by weight, and is defective in being not colorable due to the black color of the tar component, having a low hardening rate because of the non-reactivity of the tar component to the resin component and requiring a troublesome handling so as to avoid an unfavorable influence caused by harmful nitrogen-containing compounds and the carcinogenic benzypyrene contained in the tar component. Further, the hardened material resulting from the coating composition exhibits disadvantageously a heat plasticization.

In order to overcome the said defects in the conventional coating composition containing coal tar, coal tar pitch or petroleum asphalt as the tar component, various investigations have been made. As a result, it has been found that the use of cresol tar as the tar component can provide a coating composition of tar-epoxy resin or tar-polyurethane resin having various advantageous properties, as compared with the conventional one.

The coating composition of the present invention comprises an extender, a solvent and a binder containing an epoxy resin, a hardener and a tar, or a polyisocyanate, a hydroxyl compound and a tar, the tar being cresol tar, i.e. the distillation residue having a boiling point of not lower than 200° C in, said residue being produced during the preparation of cresols using cymene.

In the coating composition of the invention, the extender and the solvent may be the ones as heretofore used in the conventional coating composition of tar-epoxy resin or tarpolyurethane resin.

The binder in the coating composition of the invention is characteristic in containing cresol tar as the tar component.

The cresol tar is the distillation residue obtained in the preparation of cresols from cymene according to the so-called cymene method which comprises oxidizing cymene to cymene hydroperoxide and decomposing the latter to give a reaction mixture containing acetone and cresol. Removal of the substances having low boiling points such as acetone, unreacted cymene and dimethylstyrene and then cresol from the said reaction mixture by rectification leaves the distillation residue which is utilizable as the tar component in the coating composition of the invention. The distillation residue is a mixture of the substances having high boiling points such as 200° C or higher, preferably having boiling points not lower than 260° C at 760 mmHg, among which those having an active group(s) such as phenolic hydroxyl, alcoholic hydroxyl, acetyl and aldehyde groups may be contained. The fraction collected within a range between 200° C (preferably 260° C) and 350° C is white to light color and the fraction collected at 350° C or higher (practically collected at a lower temperature under a reduced pressure) is pale yellow to pale brown, and therefore they can be used for a colorable coating composition. The residual fraction, i.e. the pitch-wise residue, may be used for a black coating composition by dissolving it into an organic solvent such as an aromatic solvent (e.g. benzene, toluene, xylene) or anthracene oil obtained from coal tar.

The epoxy resin may be the one as used in the conventional coating composition of tar-epoxy resin and soluble in the cresol tar. Examples of the hardener are amines, amine adducts and polyamides, which are usually employed for epoxy resins.

The mixing ratio of the epoxy resin to the hardener may be determined appropriately in consideration of the hardening ability and the pot-life.

The cresol tar can be mixed according to the same procedure as in the conventional coating composition of tar epoxy resin, and the amount is favorably from 30 to 70% by weight based on the weight of the binder. When desired, the binder may contain suitable pigments, fillers, organic solvents and the like in addition to the essential materials, i.e. the epoxy resin, the hardener and the cresol tar.

Examples of the polyisocyanate are tolylenediisocyanate, 1,5-naphthylenediisocyanate, 4,4'-diphenylmethanediisocyanate, hexamethylenediisocyanate, xylylenediisocyanate and polymethylenepolyphenylenediisocyanate. The hydroxyl compound includes, for example, polyesters, castor oil and tall oil, and the most preferable compounds are polyalkylene oxides disclosed in Kobunshi Kako, 19, 734 (1970).

The hydroxyl compound is used in an amount of 0.8 to 2.0 equivalents, preferably 1 equivalent, to the isocyanate group (—NCO) contained in the polyisocyanate, and the cresol tar is used in an amount of 30 to 70% by weight based on the combined weight of the polyisocyanate and the hydroxyl compound. The binder may further contan fillers, organic solvents, organic tin compounds, anti-oxidants, ultraviolet ray absorbers and the like, when desired.

The coating composition of the present invention may be coated on various materials such as building materials, iron or non-ferrous vessels, instruments, apparatuses, steel pipes and sea side buildings accordng to any conventional procedure such as brush coating or spray coating so as to make them water-proof and corrosion inhibited.

Practical and presently preferred embodiments of the invention are illustratively shown in the following Examples wherein parts are by weight.

EXAMPLE 1

A. A mixture of an epoxy resin ("Epikote No. 1001" produced by Shell Co.) (40 parts), talc (produced by Matsumura Co.) (40 parts), xylene (10.6 parts) and sec.-butanol (9.0 parts) was passed three times through a 3 roll mill to disperse the talc well into the mixture. The resulting mixture was admixed with a mixture of a polyamide hardener ("Varsamide 125" produced by Daiichi Kogyo Seiyaku Co.) (16.0 parts) and cresol tar (transparent pale yellow liquid; B.P., 260° to 350° C; specific gravity, 1.019) (67.2 parts). The resultant coating composition was coated on a plate of mild steel having an area of 7.5 cm × 15 cm and a thickness of 0.8 mm to make a 200 μ thickness of the coated layer.

B. As in Example 1 (A) but using cresol tar (brown liquid; B.P., 260° C or higher) as a tar component, the coating composition was prepared and coated on a plate of mild steel.

For reference, a coating composition was prepared as in Example 1 (A) but using coal tar ("Tarkron No. 180" produced by Yoshida Seiyu Co. Ltd.) as the tar component and coated on a plate of mild steel.

The above obtained coated plates were allowed to stand for 7 days and then subjected to various tests. The results are shown in Table 1.

Table 1

| Example | 1 (A) | 1 (B) | Reference |
|---|---|---|---|
| Pot-life at 25° C (hr) | 24 | 24 | 24 |
| Time required for fingering dryness at 25° C (hr) | 6 | 6 | 10 |
| Time required for hardening at 20° C (hr) | 36 | 36 | 48 |
| Cross-cut | 100/100 | 100/100 | 100/100 |
| Chemical resistance | | | |
| Acid resistance (10 % H$_2$SO$_4$ sol.) | No change for 1 month | No change for 1 month | Swollen on 15th day |
| Alkali resistance (10 % NaOH sol.) | " | " | Swollen on 20th day |
| Water repellancy | No change for 1 month | No change for 1 month | No change for 1 month |
| Salt water spray resistance (300 hrs) | No change | No change | Peeled off by rust |
| Hardness of the film | HB | HB | H |
| Color of the film | Pale Yellow | Brown | Black |

EXAMPLE 2

Medium fractions of cresol tar collected at 260° to 350° C (transparent pale yellow liquid; specific gravity (d 25/4); 1.019) (40 parts), titanium white (40 parts), a polyol ("Desmophene 7200 OH No. 42" produced by Bayer A.G.; viscosity; 670 cps/25° C) (35 parts) and 4,4'-diphenylmethanediisocyanate (20 parts) were mixed uniformly. The resulting coating composition was coated on a plate of mild steel having an area of 7.5 cm × 15 mm and a thickness of 0.8 mm to make a 200 μ thickness of the coated layer.

For reference, a coating composition was prepared as above but using white tar ("Tarkron White No. 30" produced by Yoshida Seiyu Co. Ltd.) as the tar component and coated on a plate of mild steel.

The above obtained coated plates were allowed to stand for 7 days and then subjected to various tests. The results are shown in Table 2.

Table 2

| Tar | Cresol tar | White tar |
|---|---|---|
| Surface | Good, no bleeding | Clammy, large bleeding |
| Hardness | HB | HB |
| Cross cut test | 25/25 | 25/25 |
| Erichsen test | 6 mm or higher | 2 mm |
| Chemical resistance | | |
| Acid resistance (5 % HCl) | Good | Good |
| Alkali resistance (5 % NaOH) | Good | Good |
| Color of the film | | |
| The first day | Pale yellowish white | Pale yellowish brown |
| After 2 days | Pale yellow | Dark yellowish |

Table 2-continued

| Tar | Cresol tar | White tar |
|---|---|---|
| light exposure | | brown |

EXAMPLE 3

Cresol tar (brown liquid; specific gravity (d 25/4), 1.047; B.P., 230° C or higher; Engler viscosity (50/20),3) (35 parts), a polyol ("Desmophene 7200 OH No. 42" produced by Bayer A.G.; viscosity, 670 cps/⅛⅞° C) (25 parts), talc (30 parts) and tolylenediisocyanate (15 parts) were mixed uniformly. The resulting coating composition was coated on a plate of mild steel having an area of 7.5 cm × 15 cm and a thickness of 0.8 mm to make a 200 μ thickness of the coated layer.

For reference, a coating composition was prepared as above but using coal tar (refined tar produced by Osaka Gas Co. Ltd.) as the tar component and coated on a plate of mild steel.

The above obtained coated plates were allowed to stand for 7 days and then subjected to various tests. The results are shown in Table 3.

Table 3

| Tar | Cresol tar | Coal tar |
|---|---|---|
| Surface | Good, no bleeding | Somewhat good, somewhat bleeding |
| Hardness | HB | HB |
| Cross cut test | 25/25 | 25/25 |
| Erichsen test | 6 mm or higher | 4 mm |
| Chemical resistance | | |
| Acid resistance (5 % HCl) | Good | Good |
| Alkali resistance (5 % NaOH) | Good | Good |
| Color of the film | Dark brown | Black |

What is claimed is:

1. A coating composition which comprises a binder containing (1) an epoxy resin and a hardener therefor and (2) a tar, the tar being a distillation residue having a boiling point of about 200° C. to 350° C., said residue being produced during the preparation of cresols from cymene.

2. The coating composition of claim 1, wherein the tar is used in an amount of 30 to 70% by weight based on the total weight of the binder.

3. The coating composition of claim 1, wherein the distillation residue has a boiling point of not less than about 260° C.

4. The coating composition of claim 1, wherein said binder further includes an extender and a solvent.

5. The coating composition of claim 4, wherein the binder further contains fillers, organic solvents, organic tin compounds, anti-oxidants and ultraviolet ray absorbers.

6. The coating composition of claim 1, wherein the hardener is an amine, an amine adduct or a polyamide.

7. A process for coating a material which comprises applying a coating composition comprising a binder containing (1) an epoxy resin and a hardener therefor and (2) a tar, the tar being distillation residue having a boiling point of about 200° C. to 350° C., said residue being produced during the preparation of cresols from cymene, on the surface of the material, thereby making said material water-proof and corrosion-resistant.

8. A coated material obtained by the process according to claim 7.

* * * * *

UNITED STATES PATENT AND TRADEMARK OFFICE
CERTIFICATE OF CORRECTION

PATENT NO. : 3,994,735
DATED : November 30, 1976
INVENTOR(S) : Takamasa ISHIHARA et al It is certified that error appears in the above–identified patent and that said Letters Patent are hereby corrected as shown below:

IN THE HEADING OF THE PATENT:

Insert the following:

-- [30] Foreign Application Priority Data

October 5, 1971   Japan.................78533/1971 --

*Signed and Sealed this*

Third *Day of* May 1977

[SEAL]

*Attest:*

RUTH C. MASON
*Attesting Officer*

C. MARSHALL DANN
*Commissioner of Patents and Trademarks*